(12) United States Patent
Jiang et al.

(10) Patent No.: US 9,812,079 B2
(45) Date of Patent: Nov. 7, 2017

(54) ARRAY SUBSTRATE, DRIVING METHOD THEREOF AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Qinghua Jiang, Beijing (CN); Feng Qin, Beijing (CN); Xiaohe Li, Beijing (CN); Hongmin Li, Beijing (CN); Xiaojie Zhang, Beijing (CN)

(73) Assignees: BOE Technology Group Co., Ltd., Beijing (CN); Hefei BOE Optoelectronics Technology Co., Ltd., Hefei, Anhui (CN)

( * ) Notice: Subject to any disclaimer, the term of this patent is extended or adjusted under 35 U.S.C. 154(b) by 189 days.

(21) Appl. No.: 14/408,683

(22) PCT Filed: Dec. 12, 2013

(86) PCT No.: PCT/CN2013/089286
§ 371 (c)(1),
(2) Date: Dec. 17, 2014

(87) PCT Pub. No.: WO2015/035724
PCT Pub. Date: Mar. 19, 2015

(65) Prior Publication Data
US 2015/0339991 A1    Nov. 26, 2015

(30) Foreign Application Priority Data
Sep. 13, 2013 (CN) .......................... 2013 1 0420294

(51) Int. Cl.
*G09G 3/36* (2006.01)
*G02F 1/1343* (2006.01)

(52) U.S. Cl.
CPC ..... *G09G 3/3614* (2013.01); *G02F 1/134363* (2013.01); *G02F 2001/134372* (2013.01);
(Continued)

(58) Field of Classification Search
CPC ... G02F 1/134363; G02F 2001/134372; G02F 2201/121; G09G 2300/0426; G09G 3/3614; G09G 3/3648
See application file for complete search history.

(56) References Cited

U.S. PATENT DOCUMENTS

| 6,335,721 B1 | 1/2002 | Jeong |
| 8,154,567 B2 * | 4/2012 | Song .................. G09G 3/3648 345/694 |

(Continued)

FOREIGN PATENT DOCUMENTS

| CN | 1677476 A | 10/2005 |
| CN | 101308271 A | 11/2008 |

(Continued)

OTHER PUBLICATIONS

Second Chinese Office Action of Chinese Application No. 201310420294.9, dated Apr. 28, 2015 with English translation.

(Continued)

*Primary Examiner* — Afroza Chowdhury
(74) *Attorney, Agent, or Firm* — Collard & Roe, P.C.

(57) ABSTRACT

An array substrate (40), a driving method thereof and a display apparatus, relate to a field of display technique. The array substrate (40) comprises a plurality of pixel units (33) arranged in a matrix form and divided by a plurality of crisscrossed gate lines (31) and data lines (32), each of the pixel units (33) comprises pixel electrodes (331) and further comprises common electrodes (332); in the matrix of the pixel units (33), voltage polarities of the common electrodes (332) corresponding to pixel units (33) with a sum of (Continued)

numbers of rows and columns being equal are the same; voltage polarities of the common electrodes (332) of adjacent pixel units (33) are reverse. By adopting the array substrate of such a structure, the voltage swing of the data line (32) driving voltage between the positive and negative polarity gray scale is greatly reduced while the dot reversal driving is realized, thereby effectively reducing the power consumption of the array substrate (40) in the dot reversal driving mode.

14 Claims, 4 Drawing Sheets

(52) U.S. Cl.
CPC ..... *G02F 2201/121* (2013.01); *G09G 3/3648* (2013.01); *G09G 2300/0426* (2013.01)

(56) References Cited

U.S. PATENT DOCUMENTS

| | | | | |
|---|---|---|---|---|
| 8,228,274 | B2* | 7/2012 | Chung | G09G 3/3648 345/87 |
| 2003/0095091 | A1 | 5/2003 | Enomoto et al. | |
| 2004/0189918 | A1* | 9/2004 | Lee | G02F 1/134363 349/141 |
| 2005/0001808 | A1 | 1/2005 | Lee | |
| 2005/0184940 | A1 | 8/2005 | Oh et al. | |
| 2005/0190138 | A1 | 9/2005 | Jung | |
| 2005/0243236 | A1* | 11/2005 | Sumi | G02F 1/133512 349/44 |
| 2006/0092352 | A1* | 5/2006 | Lin | G02F 1/134363 349/110 |
| 2009/0237339 | A1* | 9/2009 | Pai | G09G 3/3614 345/90 |
| 2009/0279010 | A1* | 11/2009 | Kim | G02F 1/133753 349/46 |
| 2009/0322660 | A1 | 12/2009 | Chung et al. | |
| 2014/0078125 | A1 | 3/2014 | Gondo | |

FOREIGN PATENT DOCUMENTS

| | | |
|---|---|---|
| CN | 101446724 A | 6/2009 |
| CN | 102231025 A | 11/2011 |
| CN | 102654988 A | 9/2012 |
| CN | 102749775 A | 10/2012 |
| CN | 102955310 A | 3/2013 |
| CN | 203444220 U | 2/2014 |
| JP | 2003255909 A | 9/2003 |
| JP | 2012-242761 A | 12/2012 |
| KR | 10-2013-0028596 A | 3/2013 |

OTHER PUBLICATIONS

Third Chinese Office Action of Chinese Application No. 201310420294.9, dated Oct. 29, 2015 with English translation.
English translation of the International Preliminary Report on Patentability and Written Opinion of the International Searching Authority of PCT/CN2013/089286, dated Mar. 15, 2016.
English Translation of the International Search Report of PCT/CN2013/089286 published in English on Mar. 19, 2015.
Chinese Office Action of Chinese Application No. 201310420294.9 with English translation, dated Sep. 28, 2014.
International Search Report, International Preliminary Report on Patentability and Written Opinion of the International Searching Authority of PCT/CN2013/089286 in Chinese, dated Jun. 30, 2014.

* cited by examiner

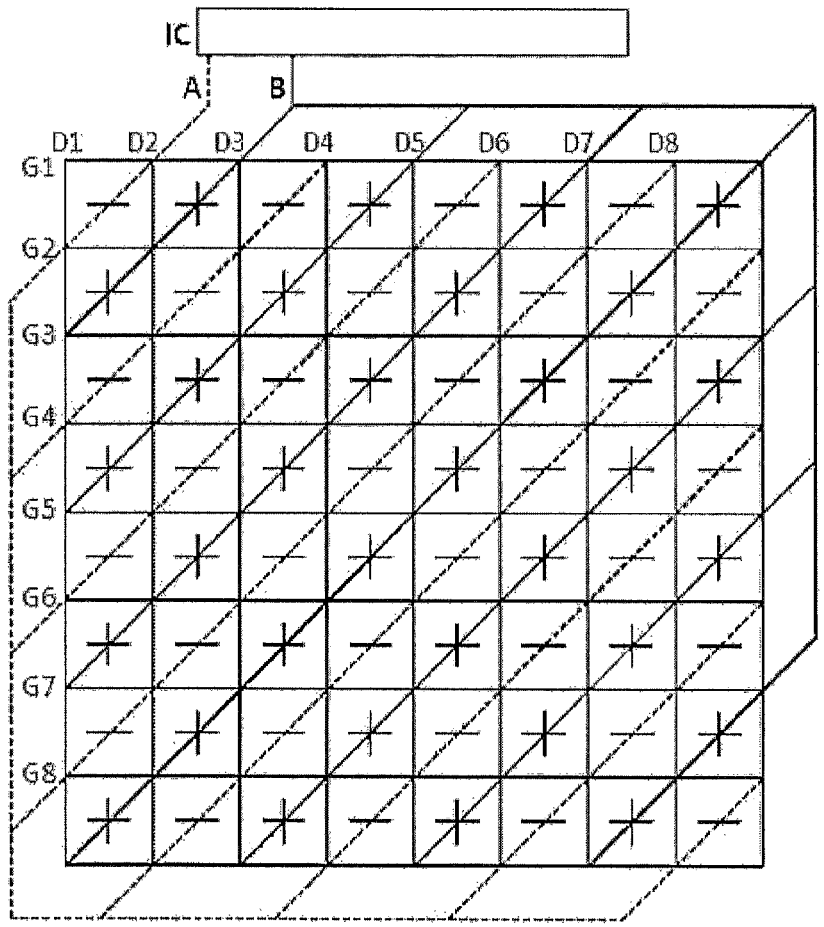

Fig.6

| when a display of a first frame picture is performed, a first voltage is input to common electrodes corresponding to pixel units with a sum of numbers of rows and columns being 2n-1 in the matrix of the pixel units | —S701 |

| a second voltage is input to common electrodes corresponding to pixel units with a sum of rows and columns being 2n in the matrix of the pixel units, polarities of the first voltage and the second voltage are reverse | —S702 |

| when a display of a second frame picture is performed, the first voltage is input to the common electrodes of the pixel units with the sum of numbers of rows and columns being 2n, and the second voltage is input to the common electrodes of the pixel units with the sum of numbers of rows and columns being 2n-1 | —S703 |

Fig.7

ARRAY SUBSTRATE, DRIVING METHOD THEREOF AND DISPLAY APPARATUS

CROSS REFERENCE TO RELATED APPLICATIONS

This application is the National Stage of PCT/CN2013/089286 filed on Dec. 12, 2013, which claims priority under 35 U.S.C. §119 of Chinese Application No. 201310420294.9 filed on Sep. 13, 2013, the disclosure of which is incorporated by reference.

TECHNICAL FIELD

The present disclosure relates to a field of display technique, in particular to an array substrate, its driving method and a display apparatus.

BACKGROUND

A liquid crystal display ("LCD" for short) is highly favored by engineers due to its characteristics of low power consumption, thin and light appearance and radiation-free and so on, and thus it has been widely used in a variety of electronic devices including electronic products such as a computer, a mobile phone and the like. The liquid crystal display generally comprises an array substrate, a color film substrate and a liquid crystal layer located between the array substrate and the color film substrate, and has mainly the following display principle: rotation angles of liquid crystal molecules in the liquid crystal layer can be changed by changing a potential difference at two ends of the liquid crystal layer, such that light transmittance of the liquid crystal has a change, so as to display different images.

In general, polarities of voltages applied to the two ends of the liquid crystal layer must be reversed every a predetermined time to avoid liquid crystal materials producing polarization and thus causing a permanent damage. There are four common modes of polarity reversal for a pixel array, frame reversal, column reversal, row reversal and dot reversal. Herein, before writing of a previous frame is ended and writing of a next frame is started, it is called as a frame reversal if voltage polarities ΔV (it is defined ΔV=pixel voltage Vpixel−common voltage Vcom) stored in pixels of the whole frame are the same (all of the voltage polarities are positive or negative); it is called as a column reversal if voltage polarities stored in pixels of the same column are the same and voltage polarities stored in pixels of adjacent columns are reverse; it is called as a row reversal if voltage polarities stored in pixels of the same row are the same and voltage polarities stored in pixels of adjacent rows are reverse; it is called as a dot reversal if a voltage polarity stored in each pixel is in reverse to voltage polarities stored in up, down, left and right adjacent pixels. In order to improve the quality of the whole display picture, a pixel dot reversal driving mode has increasingly become a present mainstream driving mode.

In the existing dot reversal driving mode, a data line signal needs to be reversed once within a scanning time for each gate line, so as to implement a dot reverse driving. By adopting such a dot reverse driving mode, since the data line driving voltage has a greatly large voltage swing between positive and negative polarity gray scales, huge power consumption will be caused in the switching process of the positive and negative polarity gray scale voltages.

SUMMARY

Embodiments of the present disclosure provide an array substrate, its driving method and a display apparatus, which can reduce power consumption of the array substrate in a dot reversal driving mode.

According to one aspect of the embodiments of the present disclosure, there is provided an array substrate comprising a plurality of pixel units arranged in a matrix form and divided by a plurality of crisscrossed gate lines and data lines. Each of the polarities of the pixel units comprises pixel electrodes and further comprises common electrodes;

In the matrix of the pixel units, voltage polarities of the common electrodes corresponding to the pixel units with a sum of numbers of rows and columns being equal are the same;

Voltage polarities of the common electrodes of adjacent pixel units are reverse.

According to another aspect of the embodiments of the present disclosure there is provided a display apparatus comprising the array substrate as described above.

According to another aspect of the embodiments of the present disclosure, there is provided a method for driving an array substrate. The array substrate comprises a plurality of pixel units arranged in a matrix form and divided by a plurality of crisscrossed gate lines and data lines. Each of the plurality of pixel units comprises pixel electrodes, and further comprises common electrodes. The method comprises:

When a display of a first frame picture is performed, a first voltage is input to common electrodes corresponding to a pixel unit with a sum of numbers of rows and columns being 2n−1 in the matrix of the pixel units;

A second voltage is input to common electrodes corresponding to a pixel unit with a sum of rows and columns being 2n in the matrix of the pixel units. Polarities of the first voltage and the second voltage are reverse;

Herein, n is a natural number.

The embodiments of the present disclosure provide the array substrate, its driving method and the display apparatus. The array substrate comprises a plurality of pixel units arranged in a matrix form and divided by a plurality of crisscrossed gate lines and data lines. Each of the plurality of pixel units comprises pixel electrodes, and further comprises common electrodes; in the matrix of the pixel units, voltage polarities of the common electrodes corresponding to pixel units with a sum of numbers of rows and columns being equal are the same; voltage polarities of the common electrodes of adjacent pixels unit are reverse. By adopting the array substrate of such structure, the voltage swing of the data line driving voltage between the positive and negative polarity gray scale is greatly reduced while the dot reversal driving is realized, so as to effectively reduce the power consumption of the array substrate in the dot reversal driving mode.

BRIEF DESCRIPTION OF THE DRAWINGS

FIG. 6 is another schematic diagram of a pixel region polarity distribution and a common polarity connection of another array substrate in a dot reversal driving mode as provided in an embodiment of the present disclosure;

FIG. 7 is a schematic diagram of flow of a method for driving an array substrate provided in an embodiment of the present disclosure.

DETAILED DESCRIPTION

Technical solutions in embodiments of the present disclosure will be clearly and completely described in combination with drawings in the embodiments of the present disclosure. Apparently, the embodiments described herein are just a part of embodiments of the present disclosure rather than all of the embodiments. All of the other embodiments obtained by those skilled in the art based on the embodiments of the present disclosure belong to the scope sought for protection in the present disclosure.

Figures 1, 2:
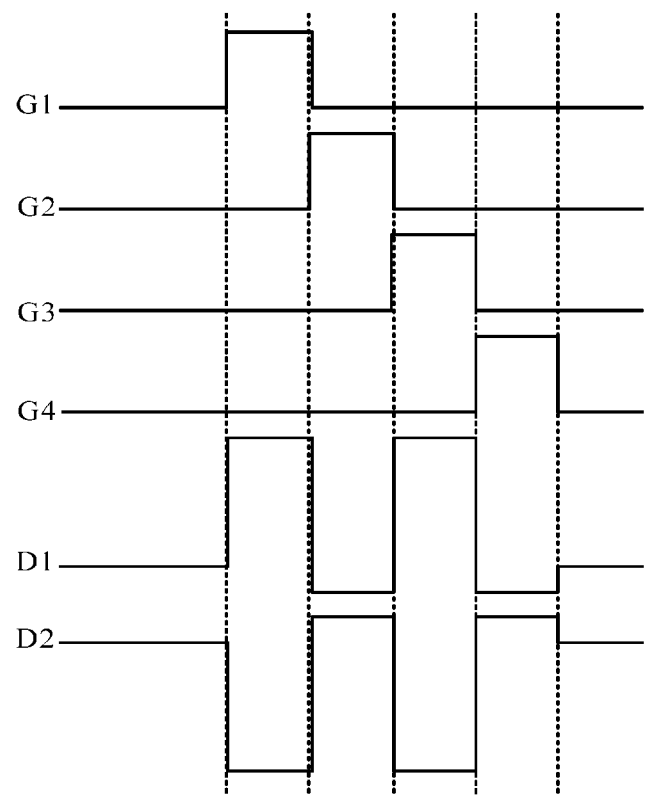
FIG. 1 is a schematic diagram of a pixel region polarity distribution of an array substrate in a dot reversal driving mode as known in the field.
FIG. 2 is a schematic diagram of signal timings of driving an array substrate in a dot reversal driving mode as known in the field.

For a dot reverse driving as shown in FIG. 1, its timing diagram is as shown in FIG. 2, wherein it is defined that a display of a certain gray scale for each pixel unit needs $\Delta V=2V$ and a common electrode voltage for each pixel unit $Vcom=3V$. Since a polarity of a pixel unit defined by a gate line G1 and a data line D1 is positive (Vpixel−Vcom=2), a voltage of the data line D1 is 5V; since a polarity of a pixel region defined by a gate line G2 and a data line D1 is negative (Vpixel−Vcom=−2), a voltage of the data line is 1V. On the analogy of this, the voltage of the data line D1 needs to be constantly reversed back and forth between 1V and 5V, and polarities of the data line D2 and the data line D1 are reverse. Since the common electrode voltage $V_{com}=3V$, the voltage of the data line D2 also needs to be constantly reversed back and forth between 1V and 5V.

Figure 3:
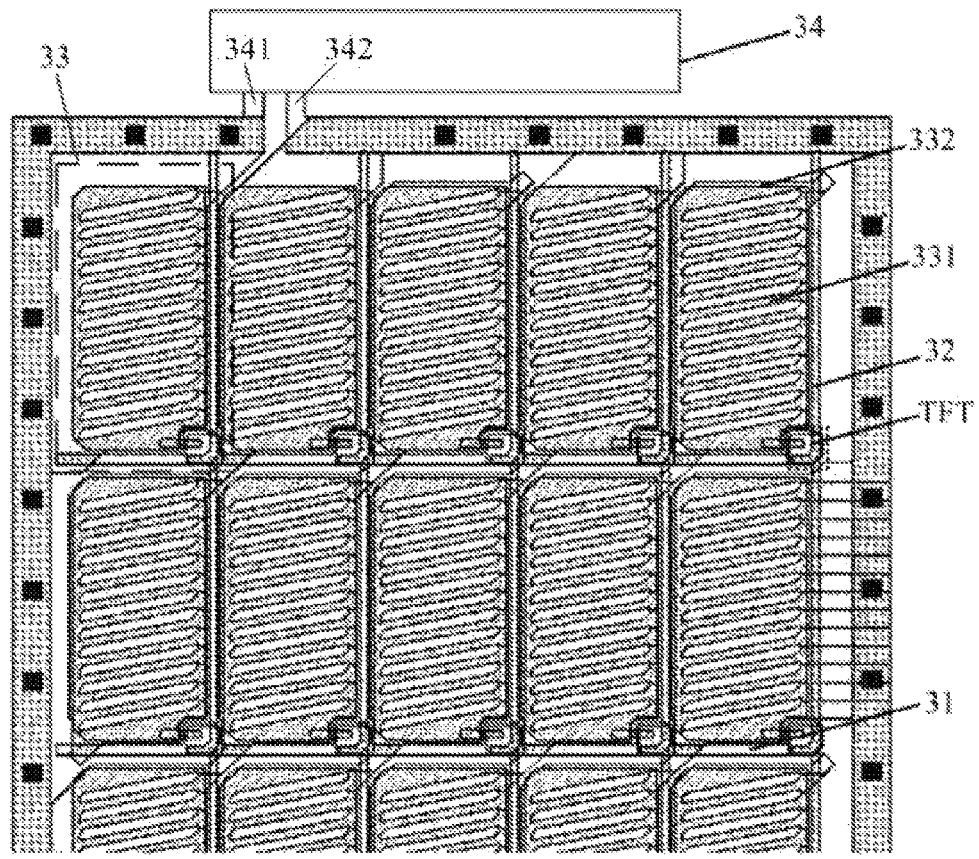
FIG. 3 is a schematic diagram of a structure of an array substrate provided in an embodiment of the present disclosure.

As shown in FIG. 3, the array substrate provided in an embodiment of the present disclosure comprises a plurality of pixel units 33 arranged in a matrix form and divided by a plurality of crisscrossed gate lines 31 and data lines 32. Each of the pixel units 33 comprises pixel electrodes 331, and further comprises common electrodes 332.

In the matrix of the pixel units 33, voltage polarities of the common electrodes 332 corresponding to the pixel units 33 with a sum of numbers of rows and columns (that is, sum of the number of rows and the number of columns) being equal are the same.

Voltage polarities of the common electrodes 332 of adjacent pixel units 33 are reverse.

For example, in the matrix of the pixel units 33 as shown in FIG. 3, a sum of numbers of rows and columns of pixel unit in the second row and first column is equal to a sum of numbers of rows and columns of pixel units in the first row and second column, and a sum of numbers of rows and columns of pixel units in the third row and first column, the second row and second column and first row and third column are equal, and so on. Since the pixel units with the sum of numbers of rows and columns being equal are arranged in an oblique line, common electrodes corresponding to each group of pixel units arranged obliquely can be connected to form a plurality of groups of common electrode strips arranged obliquely which are in parallel to each other.

Herein, common electrode strips composed of common electrodes corresponding to the pixel units with the sum of numbers of rows and columns being 2n−1 can be called as odd number of rows of common electrode strips, and common electrode strips composed of common electrodes corresponding to the pixel units with the sum of number of rows and numbers being 2n can be called as even number of rows of common electrode strips, where n is a natural number.

By adopting such a structure of the array substrate, the dot reversal driving can be implemented by controlling the voltage input to the pixel electrodes 331 and the common electrodes 332. Further, when one frame picture display is ended, the voltage polarity of each common electrode 332 will also be reversed a second time, so as to raise the frequency of the voltage reversal, thereby avoiding polarization of the liquid crystal material and improving the quality of the display device.

The array substrate provided in the embodiment of the present disclosure comprises a plurality of pixel units arranged in a matrix form and divided by a plurality of crisscrossed gate lines and data lines. Each of the plurality of pixel units comprises pixel electrodes, and further comprises common electrodes; in the matrix of the pixel units, voltage polarities of the common electrodes corresponding to pixel units with a sum of numbers of rows and columns being equal are the same; voltage polarities of the common electrodes of adjacent pixel units are reverse. By adopting such a structure of the array substrate, the voltage swing of the data line driving voltage between the positive and negative polarity gray scale is greatly reduced while the dot reversal driving is realized, so as to effectively reduce the power consumption of the array substrate in the dot reversal driving mode.

It should be noted that in the embodiment of the present disclosure, an adjacent pixel unit of a pixel unit refers particularly to a pixel unit adjacent to the pixel unit in upper, lower, left and right directions in the pixel unit array arranged in the matrix form, that is, there can be up to four adjacent pixel units for one pixel unit.

Further, in the array substrate as shown in FIG. 3, the array substrate further comprises a driving circuit 34 connected to the common electrodes 332 and configured to control the voltage of each common electrodes 332.

The driving circuit 34 can comprise a first output terminal 341 and a second output terminal 342. The first output terminal 341 is connected to the odd number of rows of common electrode strips, the second output terminal 342 is connected to the even number of rows of common electrode strips, and the polarities of the voltages output from the first output terminal 341 and the second output terminal 342 are reverse.

In the embodiment of the present disclosure, the odd number of rows of common electrode strips may have the same voltage. Likewise, the even number of rows of common electrode strips may also have the same voltage. Therefore, all of the odd number of rows of common electrode strips can be manufactured using an integration structure, and all of the even number of rows of common electrode strips can also be manufactured using the integration structure. As such, the difficulty in manufacturing the array substrate can be greatly reduced.

Further, both the first output terminal 341 and the second output terminal 342 can be made of a gate line metal layer. Herein, the gate line metal layer is mainly used to form a pattern of the gate line. In the embodiment of the present disclosure, the gate line and the pattern of the first output terminal 341 and the second output terminal 342 can be simultaneously formed by performing a composition process on the gate line metal layer, so that the hierarchical structure of the array substrate can be simplified and the difficulty in manufacturing products can be decreased.

Specifically, the driving circuit 34 can be a driving chip IC. In the array substrate as shown in FIG. 3, the strip-shaped common electrode 332 is connected to the gate line metal layer at the lowest layer around the panel, by passing through holes of a gate insulator layer and a passivation layer (not shown in FIG. 3), and the gate line metal layer is finally connected to pins of the driving chip IC, so that signals inside the driving chip IC can be loaded to the common electrodes 332, so as to connect in series the common electrodes 332 arranged obliquely, which is advantageous for reducing the power consumption for driving in the dot reversal mode. Herein, it is needed to specially indicate that although not all of the common electrodes 332 between the left and right adjacent pixels and the upper and lower adjacent pixels are connected together, both sides of the gate line 31 and the date line 32 could have a certain width of black matrix (which is manufactured on the color film substrate), and therefore phenomenon of light leakage will not occur.

The array substrate provided in the embodiment of the present disclosure is applicable to the production of the types of the liquid crystal display devices of which both the pixel electrodes and the common electrodes are arranged on the array substrate, such as Fringe Field Switching (FFS) type, Advanced-Super Dimensional Switching (AD-SDS) type and In Plane Switch (IPS) type and so on.

In the array substrate as shown in FIG. 3, it is described by taking the FFS type of liquid crystal display device as an example. The pixel electrode 331 is connected to a gate line 31 and a data line 32 through a thin film transistor (TFT) respectively.

Figure 4:
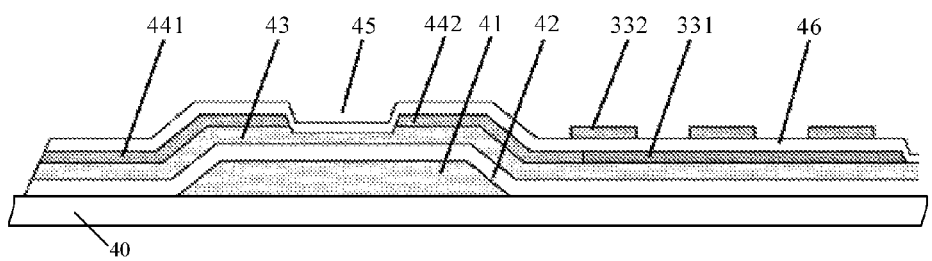
FIG. 4 is a structural section view diagram of a TFT region in an array substrate provided in an embodiment of the present disclosure.

Herein, the section view of the TFT region can be as shown in FIG. 4, which comprises a gate 41 of a TFT formed on the substrate 40, on which a gate insulator layer 42 is formed, and an active layer 43 is formed on the gate insulator layer 42 and located above the gate layer 41. One terminal of a source 441 of the TFT is located above the gate layer 41, the other terminal of the source 441 of the TFT is connected to a data line (not shown in FIG. 4), one terminal of a drain 442 of the TFT is located above the gate layer 41, the other terminal of the drain 442 of the TFT is connected to the pixel electrode 331, and a TFT channel region 45 is formed between the source 441 and the drain 442. A passivation layer 46 is formed on the aforesaid structure graphics, and the common electrodes 332 arranged in strips are formed on the passivation layer 46. In the operation, the common electrodes 332 in the odd number of rows of common electrode strips within the pixel region adopt the same voltage and the common electrodes 332 in the even number of rows of common electrode strips adopt the same voltage. Further, the polarities of the voltage of the odd number of rows of common electrode strips and the even number of rows of common electrode strips are reverse, and the pixel electrodes 331 within the adjacent pixel region have a reverse voltage. The liquid crystal molecules are driven to deflect by fringe electric field between the pixel electrodes 331 and the common electrodes 332, so as to realize a display of black and white as well as gray scale.

It should be noted that in the array substrate of the FFS type of display device, the common electrodes and the pixel electrodes can be arranged on different layers, wherein the electrodes on the upper layer comprise a plurality of strip-shaped electrodes, and the electrodes on the lower layer can be a plane-shaped or also adopts the strip-shaped electrodes, to which the present disclosure does not limit. Herein, arrangement on different layers is directed to at least two kinds of patterns. Arrangement on different layers for at least two kinds of patterns refers to form at least two patterns on at least two layers of thin films by the composition process, respectively. Arrangement on different layers for two kinds of patterns refers to form one pattern by two layers of thin films individually through the composition process. For example, arranging the common electrodes and the pixel electrodes on different layers refers to form a lower layer of electrodes by a first layer of transparent conductive thin film through the composition process and form an upper layer of electrodes by a second layer of transparent conductive thin film through the composition process, wherein the lower electrodes are the common electrodes (or the pixel electrodes), and the upper electrodes are the pixel electrodes (or the common electrodes). It shall be understood that the above is just an illustration for the embodiments of the present disclosure, but not a limitation to the present disclosure.

Such an array substrate provided in the embodiment of the present disclosure can effectively reduce the power consumption of the array substrate while realizing the dot reversal driving mode.

Figure 5:
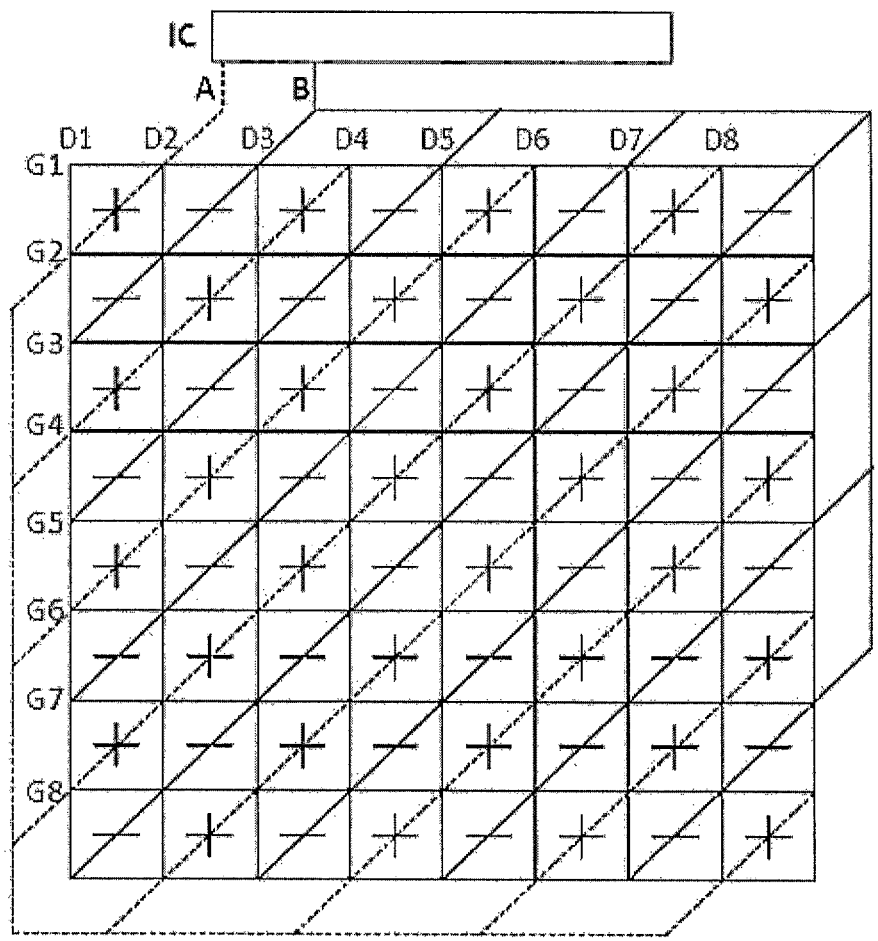
FIG. 5 is a schematic diagram of a pixel region polarity distribution and a common polarity connection of an array substrate in a dot reversal driving mode, as provided in an embodiment of the present disclosure.

In order to better understand the above principle, the mode for driving the array substrate provided in the embodiment of the present disclosure will be illustrated by referring to the schematic diagram of the pixel unit as shown in FIG. 5. It is defined that a display of certain gray scale needs a voltage difference of 2V between the pixel electrodes and the common electrodes. The common electrode voltage of the positive polarity pixel is −3V, and the common electrode voltage of the negative polarity pixel is 3V, that is, the common electrode voltage of the pixels being passed through by an oblique dotted line A in FIG. 5 is −3V, and the common electrode voltage of the pixels being passed through by an oblique solid line B is 3V.

As shown in FIG. 5, since the polarity of the pixel region defined by the gate line G1 and the data line D1 is positive ($V_{pixel}-V_{com}=2$) and the common electrode voltage $V_{com}$ is −3V, the voltage of the data line is 2+(−3)=−1V. The polarity of the pixel region defined by the gate line G2 and the data line D1 is negative ($V_{pixel}-V_{com}=-2$) and the common electrode voltage $V_{com}$ is 3V, and then the voltage of the data line is −2+3=1V. In the same way, the polarity of the pixel region defined by the gate line G3 and the data line D1 is positive and the common electrode voltage $V_{com}$ is −3V, and then the voltage of the data line −1V. On the analogy of this, the voltage of data lines D1, D3, D5 . . . is constantly reversed back and forth between −1V and 1V, and the reversal frequency is reversing once for each scanning of a row of gate line.

The polarity of the pixel region defined by the gate line G1 and the data line D2 is negative ($V_{pixel}-V_{com}=-2$) and the common electrode voltage $V_{com}$ is 3V, and then the voltage of the data line is −2+3=1V. The polarity of the pixel region defined by the gate line G2 and the data line D1 is positive ($V_{pixel}-V_{com}=2$) and the common electrode voltage $V_{com}$ is −3V, and then the voltage of the data line is 2+(−3)=1V. On the analogy of this, the voltage of data lines D2, D4, D6 . . . is also constantly reversed back and forth between −1V and 1V, and the reversal frequency is reversing once for each scanning of a row of gate line.

To sum up, in such a design structure when it is in the dot reversal driving mode, for the case that it needs a voltage difference of 2V between the pixel electrodes and the common electrodes to display certain gray scale, the voltage of all of data lines D1, D2, D3 . . . is constantly reversed back and forth between −1V and 1V, and the reversal frequency is reversing once for each scanning of a row of gate line. Compared with the common electrodes of the traditional odd and even rows (columns) being 3V, the data line needs to be constantly reversed back and forth between 1V and 5V, which evidently can save the power consumption.

Herein, it is needed to particularly indicate that in order to make the polarity of pixels between frames be reversed, as shown in FIG. 6, the voltage polarities of the common electrodes on the oblique dotted line A and the common electrodes on the oblique dotted line B are reversed once after each frame picture is ended. Such design can not only realize the dot reversal driving mode but also save the voltage output from the data line, so as to save the driving power consumption of the whole panel.

By adopting the array substrate of such structure, the voltage swing of the data line driving voltage between the positive and negative polarity gray scale is greatly reduced while the dot reversal driving is realized, thereby effectively reducing the power consumption of the array substrate in the dot reversal driving mode.

The embodiment of the present disclosure further provides a display apparatus comprising the array substrate described above.

In the embodiments of the present disclosure, the display apparatus can comprise specifically a liquid crystal display, for example, the display can be any product or component having a display function such as a liquid crystal display, a liquid crystal TV, a digital photo frame, a mobile phone or a tablet computer and the like.

It should be noted that the array substrate is applicable to the production of the type of the liquid crystal display apparatus of which both the pixel electrode and the common electrode are disposed on the array substrate, such as Fringe Field Switching (FFS) type, Advanced-Super Dimensional Switching (AD-SDS) type and In Plane Switch (IPS) type and so on.

Herein, the detailed structure of the array substrate has been described in detail in the previous embodiments, and thus no further description is repeated.

The display apparatus provided in the embodiment of the present disclosure comprises an array substrate. The array substrate further comprises a plurality of pixel units arranged in a matrix form and divided by a plurality of crisscrossed gate lines and data lines. Each of the pixel unit comprises pixel electrodes and further comprises common electrodes; in the matrix of the pixel units, voltage polarities of the common electrodes corresponding to pixel units with a sum of numbers of rows and columns being equal are the same; voltage polarities of the common electrodes of adjacent pixel units are reverse. By adopting the array substrate of such structure, the voltage swing of the data line driving voltage between the positive and negative polarity gray scale is greatly reduced while the dot reversal driving is realized, thereby effectively reducing the power consumption of the array substrate in the dot reversal driving mode.

There provides in the embodiments of the present disclosure a method for driving an array substrate. The array substrate comprises a plurality of pixel units arranged in a matrix form and divided by a plurality of crisscrossed gate lines and data lines. Each of the plurality of pixel units comprises pixel electrodes, and further comprises common electrodes. As shown in FIG. 7, the method comprises:

S701, when a display of a first frame picture is performed, a first voltage is inputted to the common electrodes corresponding to a pixel unit with a sum of numbers of rows and columns being 2n−1 in the matrix of the pixel units;

S702, a second voltage is input to the common electrodes corresponding to a pixel unit with a sum of numbers of rows and columns being 2n in the matrix of the pixel units. Polarities of the first voltage and the second voltage are reverse;

Herein, n is a natural number.

It should be noted that when the first frame picture is displayed, there is no strict sequential order for performing step S701 and step S702, and thus the order for performing the two steps can be exchanged with each other.

For example, in the matrix of the pixel units 33 as shown in FIG. 3, a sum of numbers of rows and columns of pixel units in the second row and first column is equal to a sum of numbers of rows and columns of pixel units in the first row and second column, and sums of number of rows and columns of pixel units in the third row and first column, the second row and second column and in the first row and third column are equal, and so on. Since the pixel units with the sum of numbers of rows and columns being equal are arranged in an oblique line, common electrodes corresponding to each group of pixel units arranged obliquely can be connected so as to form a plurality of groups of common electrode strips arranged obliquely which are in parallel to each other. Herein, common electrode strips composed of common electrodes corresponding to the pixel units with the sum of numbers of rows and columns being 2n−1 can be called as odd number of rows of common electrode strips, and common electrode strips composed of common electrodes corresponding to the pixel units with the sum of number of rows and numbers being 2n can be called as even number of rows of common electrode strips, wherein n is a natural number.

The embodiments of the present disclosure provide the array substrate, its driving method and the display device. The array substrate comprises a plurality of pixel units arranged in a matrix form and divided by a plurality of crisscrossed gate lines and data lines. Each of the plurality of pixel units comprises pixel electrodes, and further comprises common electrodes; in the matrix of the pixel units, voltage polarities of the common electrodes corresponding to pixel units with a sum of numbers of rows and columns being equal are the same; voltage polarities of the common electrodes of adjacent pixel units are reverse. By adopting the array substrate of such structure, the voltage swing of the data line driving voltage between the positive and negative polarity gray scale is greatly reduced while the dot reversal driving is realized, so as to effectively reduce the power consumption of the array substrate in the dot reversal driving mode.

Further, as shown in FIG. 7, the method further comprises:

S703, when a display of a second frame picture is performed, a second voltage is input to the common electrodes of which the voltage is the first voltage when the first frame picture is displayed, and the first voltage is input to the common electrodes of which the voltage is the second voltage when the first frame picture is displayed.

By adopting the array substrate of such structure, the dot reversal driving can be implemented by controlling the voltage input to the pixel electrodes and the common electrodes. Further, when a display of a frame picture is ended, the voltage polarity of each common electrode will be reversed a second time, so as to enhance the frequency of the voltage reversal, thereby avoiding the liquid crystal materials from being polarized and improving the quality of the display apparatus.

The array substrate provided in the embodiment of the present disclosure is applicable to the production of the type of the liquid crystal display device of which both the pixel electrode and the common electrode are set on the array substrate, such as Fringe Field Switching (FFS) type, Advanced-Super Dimensional Switching (AD-SDS) type and In Plane Switch (IPS) type and so on.

The embodiment of the present disclosure is described by taking the FFS type of liquid crystal display apparatus as an example. The pixel electrode is connected to the gate line and the data line through a thin film transistor (TFT) respectively. The array substrate of such FFS structure forms multidimensional electric fields through parallel electric fields produced by edges of pixel electrodes within the same plane and vertical electric fields produced between the pixel electrode layer and the common electrode layer, so that the liquid crystal molecules in all orientations right above the electrode and between the pixel electrodes, in the liquid crystal cell can produce rotation, thereby improving the operation efficiency of the plane-orientation type of liquid crystal of and increase the transmittance.

Those skilled in the art can understand that all or part of steps for implementing the above process embodiments can be completed by program instructions related hardware. The program can be stored in a computer readable storage medium. When the program is executed, the steps comprising the above process embodiments are performed; and the above storage medium comprises diversifies of media being capable of storing program codes such as ROM, RAM, disk or optical disk and the like.

The above descriptions are just specific implementations of the present disclosure, but the protection scope of the present disclosure is not limited thereto. Alternations or replacements that can be easily conceived by any one skilled who is familiar with the technical field within the technical scope disclosed in the present invention shall be covered within the protection scope of the present disclosure. Therefore, the protection scope of the present invention shall be subject to the protection of the claims.

What is claimed is:

1. An array substrate comprising a plurality of pixel units arranged in a matrix form and divided by a plurality of crisscrossed gate lines and data lines, each of the pixel units comprising a respective pixel electrode and a respective common electrode; wherein:
    in the matrix of the pixel units, corresponding common electrodes of pixel units that are arranged along a respective oblique line are electrically connected together to form a respective common electrode strip, wherein a sum of a row number and a column number of each of the pixel units that arranged along the respective oblique line is identical, and voltage polarities of the corresponding common electrodes in the respective common electrode strip are the same;
    voltage polarities of common electrodes of adjacent pixel units are reverse;
    common electrode strips corresponding to pixel units that have respective sums of row numbers and column numbers to be odd are odd-number rows of common electrode strips, and common electrode strips corresponding to pixel units that have respective sums of row numbers and column numbers to be even are even-number rows of common electrode strips, wherein a row number and a column number of a respective pixel unit respectively identify a row position and a column position of the respective pixel unit;
    the array substrate further comprises a driving circuit including a first output terminal and a second output terminal; and
    the first output terminal is connected to the odd-number rows of common electrode strips, the second output terminal is connected to the even-number rows of common electrode strips, and polarities of voltage output from the first output terminal and the second output terminal are reverse.

2. The array substrate according to claim 1, wherein a polarity of voltage of each of the common electrodes is reversed once when a display of each frame picture is ended.

3. The array substrate according to claim 1, wherein the plurality of the odd-number rows of common electrode strips have an integration structure, and the plurality of the even-number rows of common electrode strips have an integration structure.

4. The array substrate according to claim 1, wherein both the first output terminal and the second output terminal are made of a gate line metal layer.

5. A display apparatus comprising the array substrate of claim 1.

6. A method for driving an array substrate according to claim 1, comprising:
    when a display of a first frame picture is performed, a first voltage is input to common electrodes corresponding to a pixel unit with a sum of numbers of rows and columns being 2n−1 in the matrix of the pixel units;
    a second voltage is input to common electrodes corresponding to a pixel unit with a sum of rows and columns being 2n in the matrix of the pixel units, polarities of the first voltage and the second voltage are reverse;
    where n is a natural number.

7. The method for driving the array substrate according to claim 6, wherein the method further comprises:
    when a display of a second frame picture is performed, a second voltage is input to the common electrodes of which the voltage is the first voltage when the first frame picture is displayed, and the first voltage is input to the common electrodes of which the voltage is the second voltage when the first frame picture is displayed.

8. The array substrate according to claim 3, wherein both the first output terminal and the second output terminal are made of a gate line metal layer.

9. The display apparatus according to claim 5, wherein a polarity of voltage of each of the common electrodes is reversed once when a display of each frame picture is ended.

10. The display apparatus according to claim 9, wherein the array substrate further comprises:
    a driving circuit electrically connected to the common electrodes and configured to control the voltage of each of the common electrodes.

11. The display apparatus according to claim 10, wherein common electrode strips corresponding to pixel units that have respective sums of row numbers and column numbers to be odd are odd-number rows of common electrode strips, and common electrode strips corresponding to pixel units that have respective sums of row numbers and column numbers to be even are even-number rows of common electrode strips;
    the driving circuit comprises a first output terminal and a second output terminal;
    the first output terminal is connected to the odd-number rows of common electrode strips, the second output terminal is connected to the even-number rows of common electrode strips, and polarities of voltage output from the first output terminal and the second output terminal are reverse.

12. The display apparatus according to claim 11, wherein the plurality of the odd-number rows of common electrode strips have an integration structure, and the plurality of the even-number rows of common electrode strips have an integration structure.

13. The display apparatus according to claim 11, wherein both the first output terminal and the second output terminal are made of a gate line metal layer.

14. The display apparatus according to claim 12, wherein both the first output terminal and the second output terminal are made of a gate line metal layer.

* * * * *